United States Patent [19]

Shih

[11] Patent Number: 5,795,414
[45] Date of Patent: Aug. 18, 1998

[54] PUNCTURE RESISTANT TIRE ASSEMBLY

[76] Inventor: Choon J. Shih, 2083 Blueridge Dr., Milpitas, Calif. 95035

[21] Appl. No.: 630,591

[22] Filed: Apr. 10, 1996

[51] Int. Cl.⁶ ............................................. B60C 19/12
[52] U.S. Cl. ..................... 152/195; 152/204; 152/511; 152/521
[58] Field of Search ........................ 152/203, 204, 152/157, 158, 159, 511, 512, 500, 186, 195, 521

[56] References Cited

U.S. PATENT DOCUMENTS

| | | | |
|---|---|---|---|
| 467,015 | 1/1892 | Newkirk | 152/511 |
| 551,088 | 12/1895 | Murdock | 152/511 |
| 664,766 | 12/1900 | Lewis | 152/511 |
| 882,905 | 3/1908 | Marsh | 152/511 |
| 946,557 | 1/1910 | Murray | 152/204 |
| 1,123,034 | 12/1914 | Sydney | 152/512 |
| 1,491,504 | 4/1924 | Williams | 152/166 |
| 2,196,814 | 4/1940 | McClay | 152/166 |
| 2,560,609 | 7/1951 | Van Hulzen | 152/512 |

FOREIGN PATENT DOCUMENTS

| | | | |
|---|---|---|---|
| 2-53602 | 2/1990 | Japan | 152/500 |

*Primary Examiner*—Geoffrey L. Knable
*Attorney, Agent, or Firm*—Michael J. Hughes; Mark E. Baze

[57] ABSTRACT

A tire assembly (10) is provided for a pneumatic tire that gives a puncture resistant capability. The tire assembly (10) includes an inner tube (24) with an outer periphery (30) having a plurality of protruding deflectable structures (32) which are circumferentially continuous about the inner tube body (34). The deflectable structures (32) have a cross-sectional appearance that is somewhat similar to miniature, hollow fingers. The tire assembly (10) also includes a tire liner (26) that has separator structures (48) which are ridge-like in appearance and which are circumferentially continuous about the tire liner (26) as well. The separator structures (48) and deflectable structures (32) are arrayed so as to mate with one another whereby the structure of the separator structures (48) may assist the deflectable structures (32) in maintaining their finger-like shape when under load. When a tack (62) or other sharp object pierces the tire (12), it is caused to pass harmlessly between a deflectable structure (32) and a separator structure (48), the deflectable structure (32) being resiliently deflected to the side. A lubricant (66) or insert between the separator structures (48) and the deflectable structures (32) assists in the frictionless deflecture of the deflectable structures. The invention is adaptable to tubeless tires as well.

19 Claims, 5 Drawing Sheets

5,795,414

1

PUNCTURE RESISTANT TIRE ASSEMBLY

TECHNICAL FIELD

The present invention relates generally to pneumatic tires, and more particularly to pneumatic tires of the puncture-resistant variety.

BACKGROUND ART

It could not have been too long after John Dunlop's "reinvention" in 1888 of a pneumatic tire for bicycles that the quest began in earnest for a pneumatic tire that would be puncture-proof, or at least puncture resistant, to hazards such as nails, thorns, and broken glass, as are commonly encountered on the roadway. The frustration and inconvenience that can occur when a tire unexpectedly fails goes without saying. A flat tire can leave the cyclist or motorist stranded in a vulnerable situation, and a sudden loss of tire pressure and the resulting loss of control can be extremely hazardous as well.

The susceptibility of the pneumatic tire to puncture is inherent in the nature of the elastomeric material that comprises the tire or the tire and the inner tube in the case of a bicycle. When inflated, such elastomeric materials have the well known characteristics of providing both a cushioned ride and also giving greater traction than other materials, while simultaneously having a decreased resistance to sharp objects. A number of proposals have been made as to how this susceptibility to puncture might be dealt with. Included among these are so-called "run-flat" tires, wherein a pressurized safety structure located within a (automobile) tire expands upon deflation of the tire to pneumatically fill the tire carcass (e.g., U.S. Pat. No. 4,254,810 issued on 10 Mar. 1981 to Schichman). Such a system does nothing, of course, to prevent or reduce a puncture in the first place, and the design of such internal structures appears to be sufficiently complicated as to be expensive and difficult or awkward to implement, and also to be likely to have a performance that is inconsistent. Another "solution," similar in vein to the foregoing, is the use of various polymeric sealing substances containing adhesive and rubber that are thickly coated upon the inside of a tire prior to mounting and in which advantage is taken of the tendency of such substances to flow into small punctures under the normal operating conditions of the tire and to provide at least a temporary fix thereby (e.g., U.S. Pat. No. 3,860,539 issued on 14 Jan. 1975 to Miyazato).

Other methods of dealing with the possibility of tire puncture provide for individual pressurized cells or compartments, of a tubular or cylindrical cross-section, which are positioned transversely to the tire tread. When a puncture occurs, deflation is generally limited to only one or two of the compartments. Such a design incorporates the inconvenience that each compartment generally must have a separate valve stem for inflation and pressure maintenance, and in any event, tires of this type are difficult and expensive to manufacture (see U.S. Pat. No. 4,367,109 issued on 4 Jan. 1983 to Estrade, et al.). A variation on the forgoing (shown in U.S. Pat. No. 3,574,317 issued on 13 Apr. 1971 to Brewer, et al.) is the employment within a tire of a number of small pressurized sacs. In this latter situation, the multi-sac-containing tire is inflated in the usual manner, which acts as the principal means of pressurization. When puncture of the main tire portion occurs, cushioning support is provided by the pressurized sacs (which may have also been diminished in number by the puncture) to provide a continued, if limited operation. Again, however, neither of these methods address the problem of puncture prevention itself.

2

Methods which attempt to prevent puncture altogether appear to have been limited to date to so-called tire "liners," which are attached to the inside of the tire casing, or pressurably sandwiched between the casing and an inner tube, and which are made of a layer of puncture resistant material such as lead or a similar highly malleable metal, or of a thicker layer of high pressure and temperature molded and vulcanized rubber (e.g., U.S. Pat. No. 4,262,719 issued on 21 Apr. 1981 to Price). Such liners add significantly to the weight of the tire, which results in a correspondingly reduced fuel efficiency or increased difficulty in propulsion for a cyclist.

Because of the limitations associated with most presently available puncture resistant and "puncture-proof" pneumatic tires, a substantial need still exists for such a tire or tire assembly that is easy to manufacture, inexpensive, and which does not give a substantially increased weight.

DISCLOSURE OF THE INVENTION

Accordingly, it is an object of the present invention to provide a pneumatic tire assembly that is puncture resistant.

It is another object of the present invention to provide a tire assembly that resists puncture by sharp objects through a deflecting action.

It is a further object of the present invention to provide a puncture resistant tire assembly that does not significantly increase the weight of the tire.

It is yet another object of the present invention to provide a puncture resistant tire assembly, the use of which does not significantly adversely affect the "ride" of the tire.

It is yet a further object of the present invention to provide a puncture resistant tire assembly which is radially symmetrical.

It is still another object of the present invention to provide a puncture resistant tire assembly that is simple in construction and materials.

It is a still further object of the present invention to provide a puncture resistant tire assembly that is easy to implement with existing tires.

It is still another object of the present invention to provide a puncture resistant tire assembly which uses the same class of materials as ordinary inner tubes and tires.

Briefly, the preferred embodiment of the present invention is a tire assembly for a pneumatic tire that provides a puncture resistant capability. The tire assembly includes a toroidally fashioned inner tube having a conventionally shaped inner tube inner periphery that is mounted upon a wheel rim in the usual fashion, with an inner tube outer periphery having protruding deflectable structures that are hollow and which are circumferentially continuous about an inner tube body. The deflectable structures, in cross-section, somewhat resemble miniature fingers. The preferred tire assembly also includes a tire liner that is provided with separator structures which are ridge-like and which are circumferentially continuous about the tire liner. The separator structures are arrayed so as to be correspondingly insertable between the deflectable structures. The structure of the tire liner assists the deflectable structures in maintaining a tapered and cross-sectionally finger-like form when the tire is under load.

When a sharp object such as a tack or thorn pierces the tire, the interaction between the tire liner and the deflectable structures is such that the sharp object is caused to pass between the deflectable structures and to slide along the supportably inclined surface of the deflectable structures.

The deflectable structures are resiliently and harmlessly deflected to the side, while folds present between the deflectable structures have a length sufficient to accommodate the typical sharp object and to prevent puncture of the inner tube body thereby. The preferred embodiment of the present invention also includes a lubricant or an insert to ensure that the deflectable structures, which, being made of an elastomeric material, may exhibit a tacky quality, are free to slidably move as necessary in response to contact with the sharp object.

An advantage of the present invention is that the tire assembly may be subjected to multiple piercings by sharp objects without any decrease in performance, that is, the tire assembly is not limited to a one-time deployment capability.

Another advantage of the present invention is that the tire assembly is simple and inexpensive to manufacture using currently existing manufacturing techniques.

A further advantage of the present invention is that the tire assembly may be incorporated into conventional pneumatic tires.

Yet another advantage of the present invention is that the tire assembly may be easily produced in a variety of sizes to accommodate different tire sizes.

Yet a further advantage of the present invention is that, except for the most serious racing enthusiast, the tire assembly does not add weight that is appreciably noticeable.

Still another advantage of the present invention is that the "feel" of the tire is not adversely affected and the exterior visual appearance of the tire is unchanged.

A still further advantage of the present invention is that only a single, conventional inflation valve is required.

Yet another advantage of the present invention is that the tire assembly is easily installed by a user, without special tools.

These and other objects and advantages of the present invention will become clear to those skilled in the art in view of the description of the best presently known mode of carrying out the invention as described herein and as illustrated in the several figures of the drawings.

BEST MODE FOR CARRYING OUT THE INVENTION

Figure 1:
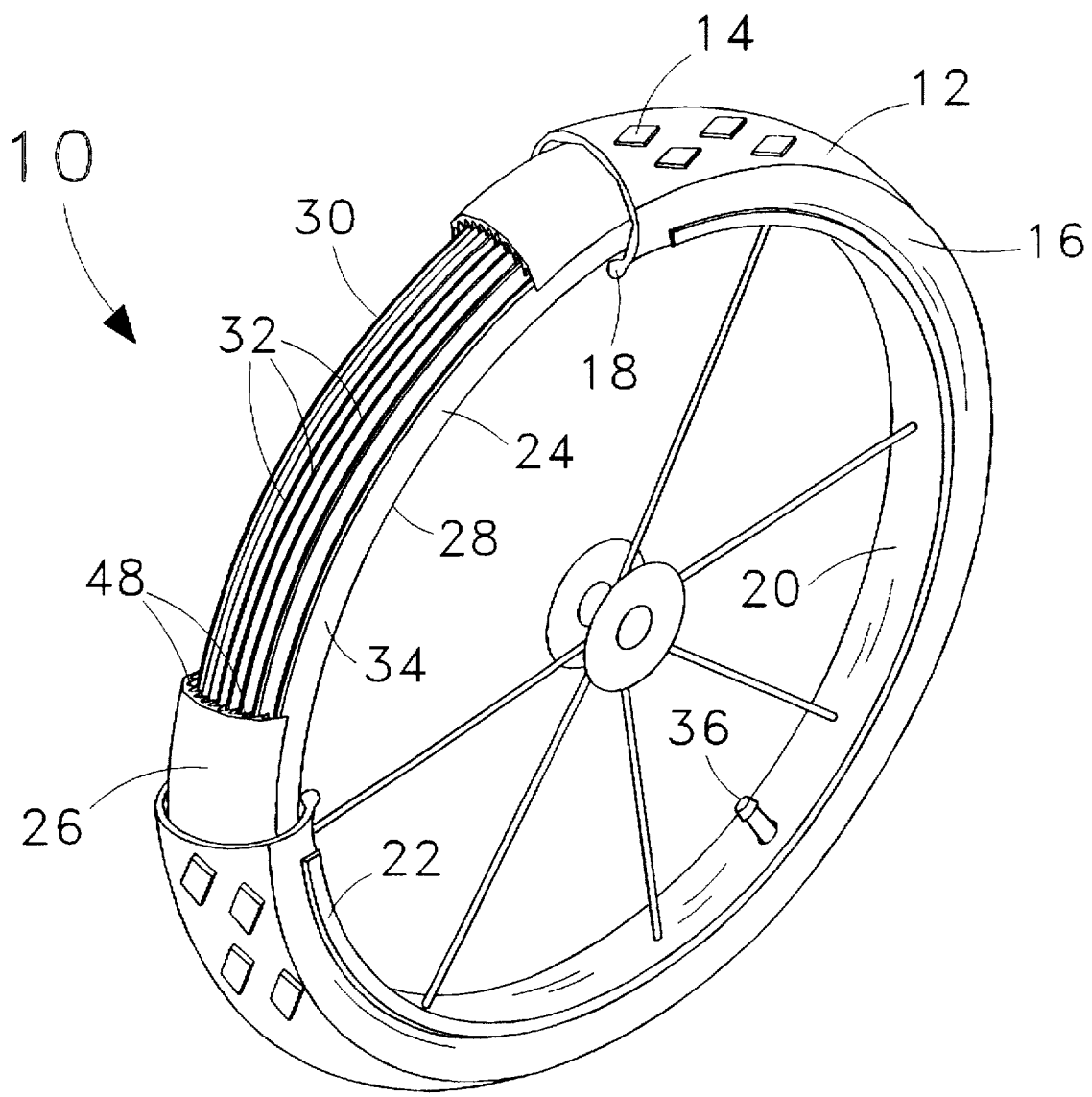
FIG. 1 is a cut-away perspective view of the tire assembly of the preferred embodiment of the present invention.

The preferred embodiment of the present invention is a puncture resistant tire assembly for pneumatic tires. The tire assembly of the preferred embodiment, although generally applicable to any pneumatic tire, is directed towards bicycle tires and is illustrated and set forth in FIG. 1 of the drawings, where it is designated therein by the general reference character 10.

Referring initially to the cut-away perspective view of FIG. 1, a typical bicycle tire 12 is shown having the conventional components of a circumferential tire tread 14, a pair of annular tire side walls 16, and a pair of reinforcing tire beads 18. The tire 12 is mounted upon a wheel rim 20 having radial flanges 22 which accommodate a detachable, pressurized anchoring of the tire 12 via the tire beads 18 in the usual manner. The puncture resistant tire assembly 10 is arranged internally of the tire 12.

Continuing to refer to FIG. 1, the tire assembly 10 is seen to include a toroidally fashioned inner tube 24 of a structure that is believed to be unique to the present invention and which, in conjunction with a tire liner 26, having a structure that is likewise believed to be unique, provides a deflecting ability to prevent (minimize) penetration and consequent perforation of the inner tube 24 by sharp objects lying in the path of the tire 12, as will be described shortly herein. The inner tube 24 includes an inner tube inner periphery 28 which assumes an aspect substantially similar to that found in a conventional inner tube, and which engages the entire circumference of the wheel rim 20 in typical fashion. The inner tube 24 departs from convention, however, in exhibiting an inner tube outer periphery 30 that is provided with a multiplicity of deflectable structures 32. The deflectable structures 32 are hollow and are preferably integrally formed with an inner tube body 34 in a molding process comprised of steps as are typically employed in the production of currently commercially available inner tubes. The inner tube 24 is also provided with a valve stem 36. The valve stem 36 is of the usual type and extends from the inner tube inner periphery 28 and through the wheel rim 20 in the characteristic radially-inward direction. Inflation of the inner tube 24 via the valve stem 36 causes a corresponding pressurization of both the inner tube body 34 and of the deflectable structures 32. Thus, in the tire assembly 10 of the presently preferred embodiment, the inner tube body 34 and the deflectable structures 32 are under an equivalent and coextensive pressure that is generally within the range of that found in a typical bicycle tire.

The structure, location, and general nature of the deflectable structures 32, and the interrelationship and working of the deflectable structures 32 with the tire liner 26, will now be described in further detail in this and succeeding paragraphs. As shown in FIG. 1 and in the cross-sectional view of FIG. 2, the deflectable structures 32 run along the inner tube body 34 in an annular fashion. Each deflectable structure 32 has a protruding shape that, in cross-section, somewhat resembles that of a miniature finger. In the preferred embodiment, the deflectable structures 32 are aligned in distinct rows (ten are depicted) that are circumferentially continuous and parallel to one another about the inner tube outer periphery 30. The deflectable structures 32 are oriented so as to protrudingly extend outward in substantial radial alignment with radii as define the wheel rim 20. This orientation is preferred, of course, so as to reduce as much as possible the surface area of the deflectable structures 32 made vulnerable to perforation after the occurrence of a substantially vertical piercing of the tire tread 14 by a sharp object. In the vein of the forgoing, the deflectable structures 32 also include a tip 40 that is tapered or pointed to likewise reduce the amount of surface area that is vulnerable to being pierced. That the tips 40 are tapered is also of importance for the desired interaction of the deflectable structures 32 with the tire liner 26, as will be described later herein.

Figure 2:
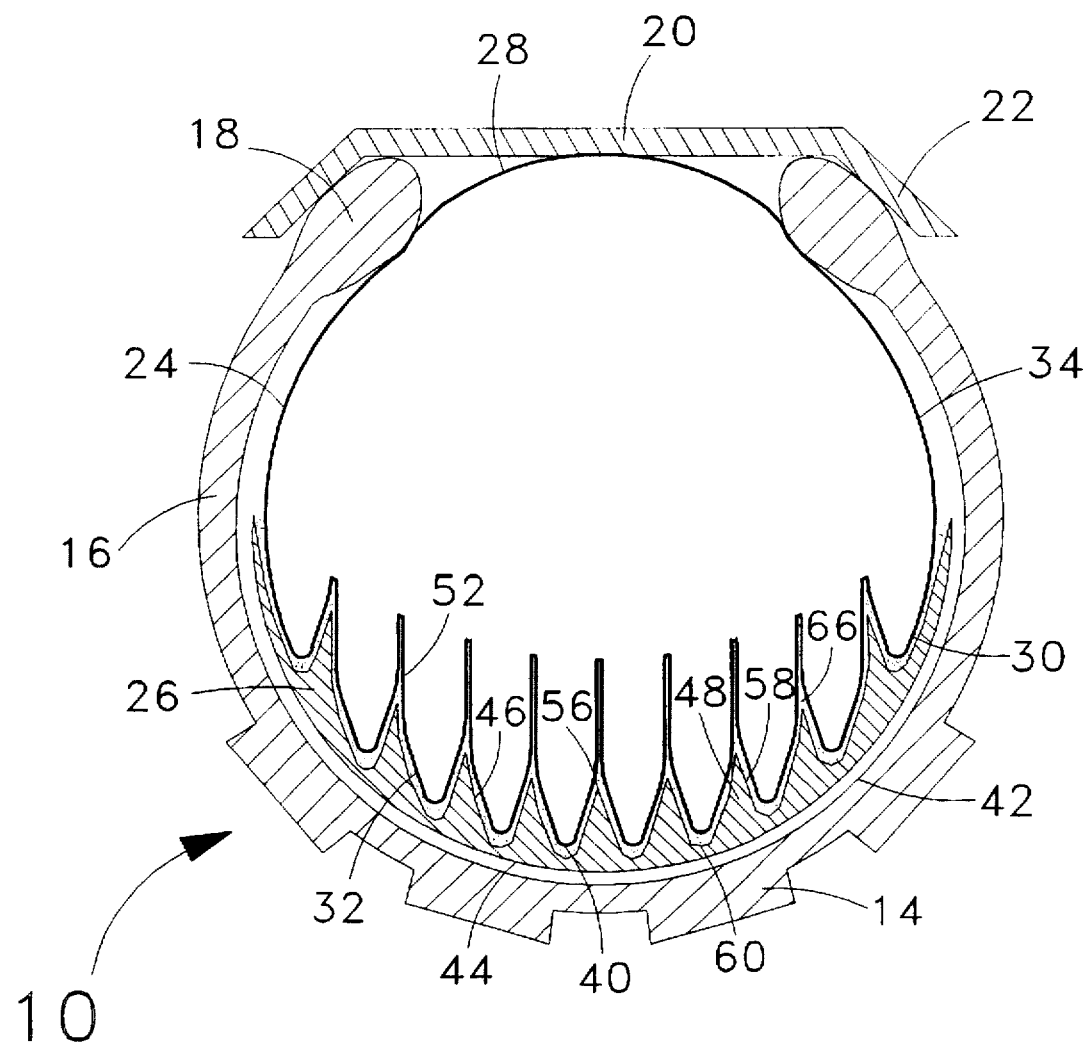
FIG. 2 is a cross-sectional view of the tire assembly of FIG. 1.

The deflectable structures 32, depending on their location, are of a length that is at least as great as that of such hazardous sharp objects as tacks and thorns as are commonly and recurringly encountered on the ground. Referring to FIG. 2, the deflectable structures 32, it will be noted, are of a diminishing length as one views centrally located deflectable structures 32 as compared with deflectable structures 32 lying in closer proximity to, or in contact with, the tire side walls 16. This diminishing length is a result of both the transversely arcuate shape of the tire 12, such a shape being commonly incorporated into conventional bicycle and passenger tires of all types, and also the degree to which those portions of the tire 12 in closer proximity to the tire side walls 16 are expected to make contact with the ground when the tire 12 is under load. That is, as between two sharp objects of an identical length, one such sharp object piercing the tire 12 at a point nearer to the tire side walls 16 will not have as great of an ability to make a piercing entry into the inner tube 24 as that of the second sharp object piercing at a more centrally located point.

As might be surmised from the earlier reference to current commercial manufacturing processes for inner tubes of conventional design, the inner tube 24 of the present invention, and correspondingly the deflectable structures 32, are preferably formed of elastomeric materials, including synthetic and natural rubbers, and mixtures thereof, as are typically employed for such conventional inner tubes. The use of an elastomeric material provides that the deflectable structures 32 have the ability to serve in both a supporting capacity, as with a conventional inner tube, while being sufficiently flexible so as to be resiliently movable from side to side when necessary and thereby avoid penetrating objects.

Continuing to refer to FIG. 2, the tire liner 26, in the preferred embodiment, incorporates the means by which the deflectable structures 32 are induced or assisted into the aforementioned avoidance action when the tire 12 rolls over a sharp object that pierces the tire 12. The tire liner 26 is disposed between a tire interior surface 42 and the inner tube outer periphery 30. The tire liner 26 has the general form of an annular band and includes a relatively smooth liner outer surface 44 and a liner inner surface 46 that is ribbed with separator structures 48. Both the liner outer surface 44 and the liner inner surface 46 lie in substantially circumferentially continuous contact with the tire interior surface 42 and the inner tube outer periphery 30, respectively. Liner side portions 50 extend laterally to slightly beyond the width of the tire tread 14 and partially up the tire side walls 16 so that the liner inner surface 46 and the separator structures 48 are in contact with all of the deflectable structures 32 as are positioned about the inner tube outer periphery 30. The interaction between the tire liner 26 (or more specifically the separator structures 48) and the deflectable structures 32 provides that when a sharp object, such as a tack or thorn, pierces through the tire 12, the sharp object is most probably caused to go harmlessly between the deflectable structures 32 and into one of many folds 52 therebetween, rather than puncturing any part of the inner tube 24.

The separator structures 48 are integral with the tire liner 26 and have a generally ridge-like appearance. In similar fashion to the deflectable structures 32, the separator structures 48 extend in parallel and continuous rows (nine are shown) along the liner inner surface 46. Each separator structure 48 has a crest portion 56 with side surfaces 58 that are inclined, while between each separator structure 48 there lies a liner valley 60. The pattern or array of the separator structures 48 upon the tire liner 26 is such that when the tire liner 26 is circumferentially disposed about the inner tube 24, the crest portions 56 may be insertably positioned into the folds 52 between the deflectable structures 32. With the crest portions 56 so inserted, the liner valleys 60 are correspondingly in alignment to mateably and cradlably receive the tips 40 of the deflectable structures 32. When so mated together, the inner tube 24 and the tire liner 26 produce a puncture resistant capability the unique nature of which is now described in the following and subsequent paragraphs.

Figure 3:
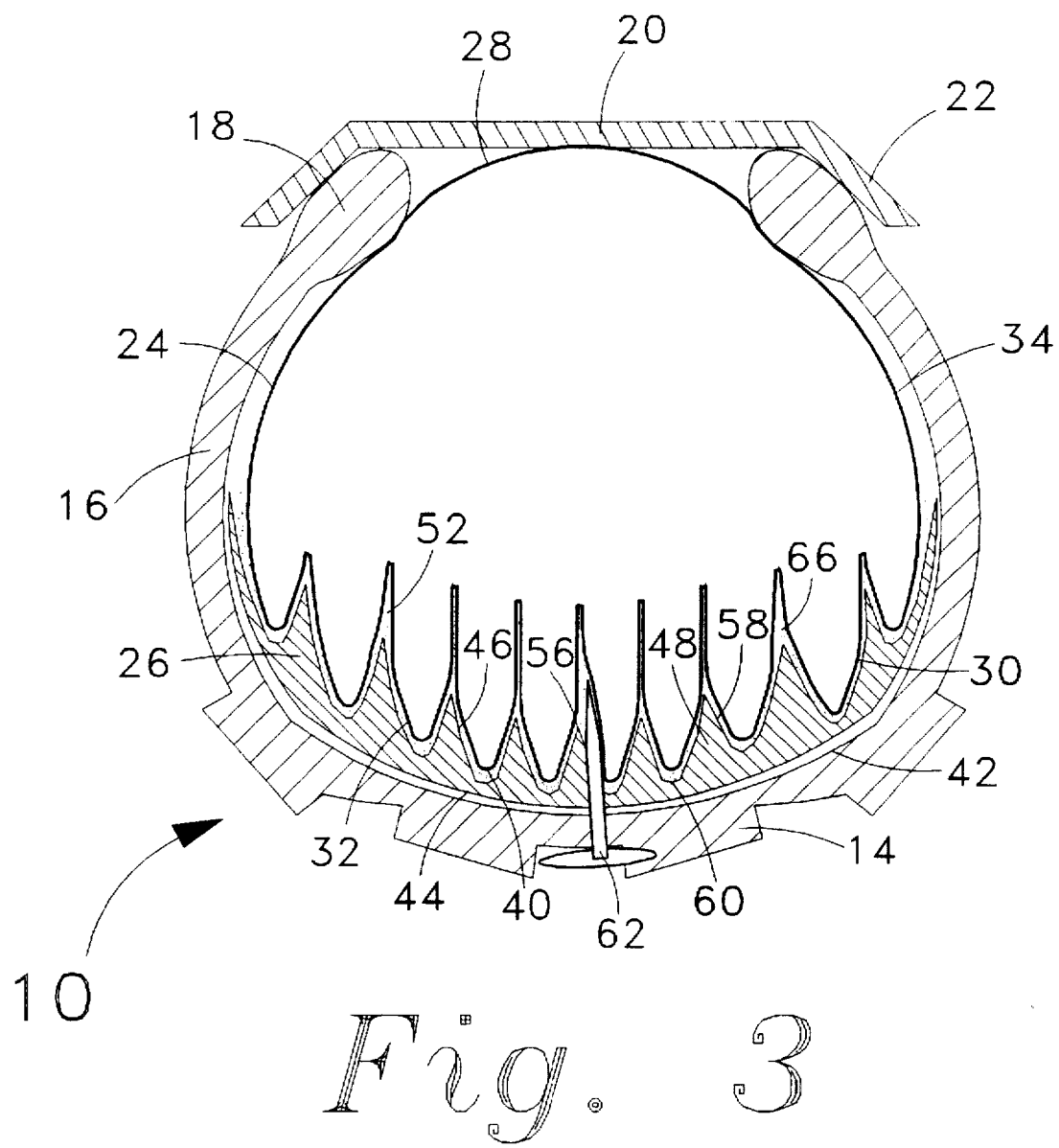
FIG. 3 is a cross-sectional view of the tire assembly of FIG. 1 when under load and subject to piercing by a tack.

Referring now to FIG. 3, the characteristics of the puncture resistant tire assembly 10 of the present invention are such that when a tack 62, for example, makes a substantially vertical piercing of the tire 12 (shown under moderate load in the Figure) one of two possibilities will exist with regard to a subsequent contact by the tack 62 with the inner tube 24. In the much more rare possibility, which yields the deleterious result of actual puncture of the inner tube 24, if the point of the tack should unluckily penetrate the tire liner 26 at precisely the location of the center of a liner valley 60, then chances are fairly high that puncture of the tip 40 of the deflectable structure 32 received therein will occur, with a corresponding deflation of the inner tube 24. If, on the other hand, and as is much more likely statistically, the point of the tack 62 penetrates the tire liner 26 at any other location, then the deflectable structures 32 are of a form, and are maintained in such a position by the separator structures 48, so that the point and shaft of the tack 62 will be caused to slide along the surface of one or two of the deflectable structures 32 and go within the fold 52 therebetween, as shown in the Figure. The resilient nature and tapered shape of the deflectable structures 32 thus permits the deflectable structures 32 to be harmlessly deflected to the side and away from the point of the tack 62 upon contact therewith.

Thus, it will now be apparent that the separator structures 48 act as both spacers and as reinforcing forms to preserve the deflectable structures 32 in a relatively (cross-sectionally) finger-like form and therefore in a deflectable shape and capacity. That is, when the deflectable structures 32 are under load, the liner 26 helps to preserve the tapered shape of the deflectable structures 32 and to substantially inhibit the flattening which would otherwise occur were the deflectable structures 32 under load without such structural reinforcement. If significant flattening were permitted to occur, then the deflectable structures 32 would offer little advantage over a conventional inner tube. If a sharp object should penetrate the tire liner 26 at a point which correlates closely with a crest portion 56 of a separator structure 48, then the separator structure 48 itself may provide the only defense that is necessary due to the sharp object not being long enough to perforatorily exit through the taller crest portion 56, or because the separator structure 48 has acted to spaceably distance the deflectable structures 32 far enough apart so that the sharp object is simply inserted harmlessly into a fold 52 therebetween. Thus, it will be seen that while the tire assembly 10 of the present invention is not entirely "puncture proof," the tire assembly 10 provides a puncture resistant capacity which drastically reduces the likelihood of puncture, all the while keeping excess weight and reduction in ride quality, as would be associated with a tire liner of uniform and greater thickness, to a minimum.

The tire liner 26 may be made of elastomeric or plastic or any such similar type of material, the idea being to yield a tire liner 26 which provides the necessary separatory quality and which provides sufficient structural maintenance for the deflectable structures 32, while being reasonably flexible, resilient and lightweight. A separate tire liner 26 could in fact be dispensed with if a tire were used in which a molding process for that tire integrally incorporates the separator structures 48 into the interior surface of the tire itself.

The preferred embodiment of the present invention also provides for a method that assists the deflectable structures 32 in being more easily deflected upon contact with a penetrating sharp object. Because elastomeric materials as commonly used to form inner tubes have tendency to "stick" together, it is beneficial to introduce either a lubricant, powder, or an insert, which prevents friction and assists the deflectable structures 32 in sliding freely as amongst each other and as amongst the separator structures 32. An insert might be conveniently made of paper, for example, which is corrugated to conform to the distancing of the deflectable structures 32. In FIGS. 2 and 3, a lubricant as introduced between the inner tube outer periphery 30 and the tire liner 26 is designated with the reference numeral 66.

It would be apparent to one skilled in the art that the deflectable structures 32 need not run in a completely continuous, torodial fashion around the inner tube body 34 and that, in fact, the deflectable structures 32 could have a shape, and not just a cross-sectional shape, that is analogous to a miniature hollow finger. Similarly, "partial" deflectable structures could be provided that would have a shape that would extend about the circumferential direction of the inner tube outer periphery 30 to an extent greater than that of a finger shape but not to the extent of the continuously circumferential deflectable structure 32. As shown in the alternative inner tube 68 of the side elevational view of FIG. 4, as with the deflectable structures 32 of the preferred embodiment, such finger-like deflectable structures or deflectable fingers 70 would be formed to protrude from an inner tube body 72, in a similar manner to the deflectable structures 32, so that the central axes of the deflectable fingers 70 are in substantial alignment with the radii defining the wheel rim 20 (not shown in the Figure). These deflectable fingers 70 might be laid out in a variety of arrays, and within such arrays both the deflectable fingers 70 and the deflectable structures 32 (or "partial" deflectable structures) could be incorporated.

Figure 4:
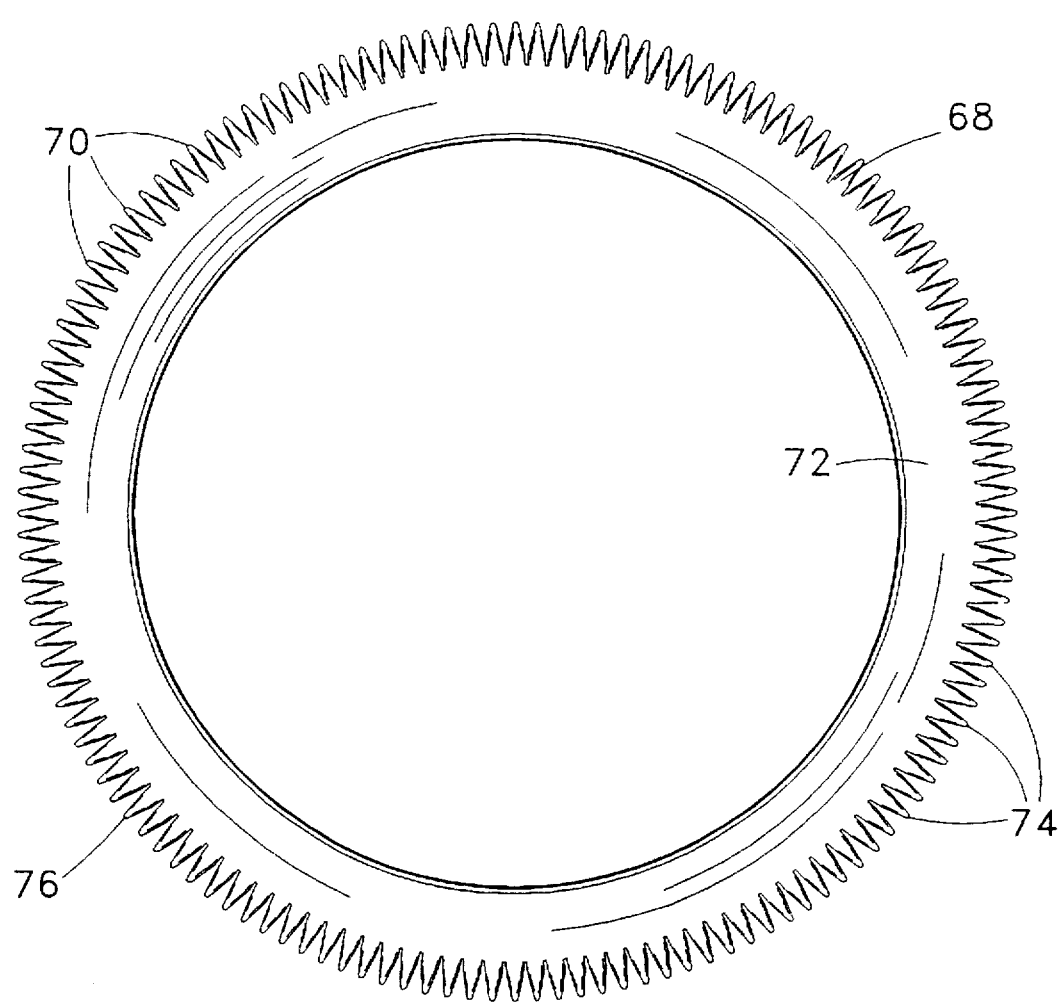
FIG. 4 is a side elevational view of an alternative embodiment of the inner tube of the tire assembly of the present invention.

Perhaps the simplest array incorporating only the deflectable fingers 70 would be an array, as shown in FIG. 4, in which the deflectable fingers 70 are aligned in distinct rows 74. The rows 74 are oriented in transverse fashion across the inner tube body 72 and are further uniformly spaced about an entire inner tube outer periphery 76. Thus, the central axes of the deflectable fingers 70 within a given row 74 bear a substantially parallel relation to one another, while the central axes of deflectable fingers 70 of different rows 74 exhibit some angular relationship that is dependent on the displacement of the deflectable fingers 70 about the circumference of the inner tube 68. While such deflectable fingers 70 provide for an even further reduced possibility for puncture of the inner tube 68, such an inner tube 68 is also significantly more difficult to mateably join with a correspondingly extensively honeycombed tire liner (not shown) making the alternative inner tube 68 somewhat less desirable on balance.

Figure 5:
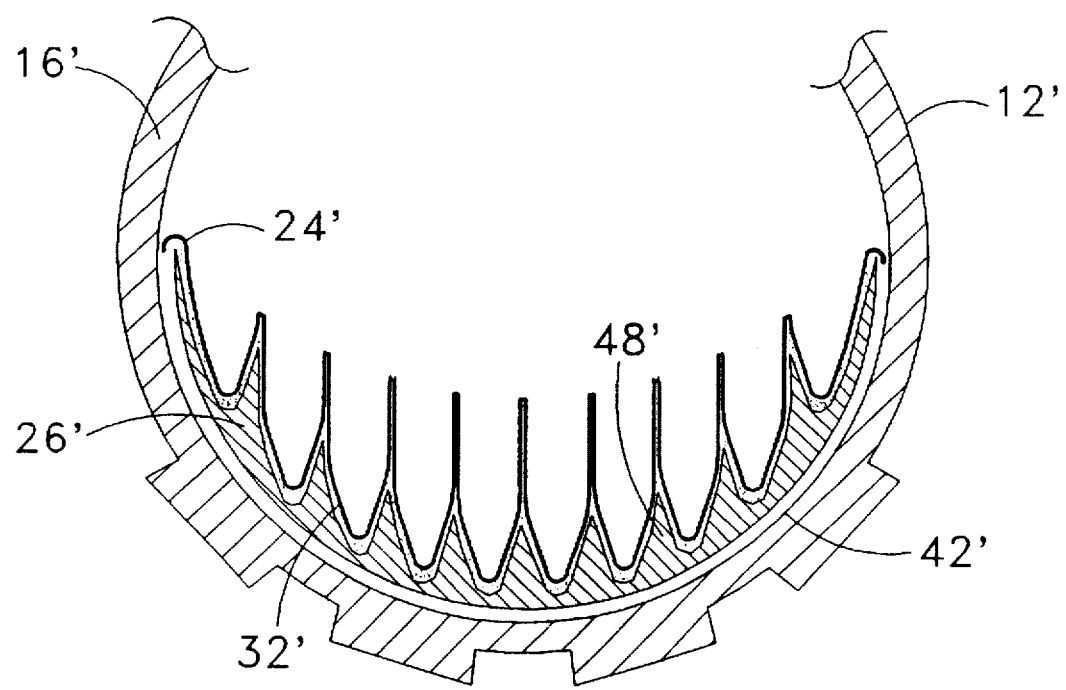
FIG. 5 is a partial cross-sectional view of a tubeless tire embodiment of the present invention.

It is also envisioned that the invention embodied herein is equally applicable to tires of the so-called tubeless variety. Thus, and referring now to FIG. 5 a tubeless tire 12' may be provided in which a first tire liner 26' having separator-type structures 48' similar to tire liner 26 is present (perhaps integrally fashioned with the tire itself, as noted previously, or bonded to the interior surface of the tubeless tire 12'). A second tire liner 24' is then also present whose lateral edges are bonded to the interior surfaces 42' of the side walls 16' of the tubeless tire 12'. The second tire liner 24' includes deflectable, hollow outwardly extending structures 32' similar to the deflectable structures 32 of the preferred embodiment, the first and second tire liners (26' and 24') mating together as the inner tube 24 and tire liner 26 of the preferred embodiment do and providing a similar protection for a new variety of tubeless tire thereby.

In addition to the above mentioned examples, it is to be understood that various other modifications and alterations with regard to the types of materials used, their method of joining and attachment, and the shapes, dimensions and orientations of the components as described may be made without departing from the invention. Accordingly, the above disclosure is not to be considered as limiting and the appended claims are to interpreted as encompassing the entire spirit and scope of the invention.

INDUSTRIAL APPLICABILITY

The puncture resistant tire assembly 10 of the present invention is designed to be used with any tire of the pneumatic type, including those used on bicycles, motorcycles and automobiles. Implementation of the tire assembly 10 is simple. In the case of a bicycle, the tire liner 26 is first positioned within the tire 12 so that the tire liner 26 is centered between the tire side walls 16, with the ridge-like separator structures 48 appropriately facing inward. The lubricant 66 is then applied to the deflectable structures 32 and to the folds 52 of the partially inflated inner tube 24. Next, the inner tube 24 is inserted within the tire 12, taking some care to insure that the tips 40 of the deflectable structures 32 are in alignment within the corresponding liner valleys 60. The tire 12 containing the tire assembly 10 is then positioned about the wheel rim 20 with the tire beads 18 placed within flanges 22 in the usual manner. The tire 12 is inflated via the valve stem 36 to the desired pressure and the tire assembly 10 is made operational thereby.

The tire assembly 10 of the present invention provides that when a sharp object such as a thorn or tack 62 is encountered by the tire 12, although piercing of the tire 12 will occur, the likelihood of puncture of the inner tube 24 itself is greatly reduced by the deflecting action of the deflectable structures 32 and the tire liner 26. When the cyclist or motorist at some later time discovers the sharp object impaled upon the tire 12, it would be, of course, prudent to immediately remove the object in order to prevent further possible damage.

The tire assembly 10 of the present invention offers substantial advantages in that it is simple in design, inexpensive to manufacture, and of a light weight. For these reasons and numerous others as set forth previously herein, it is expected that the industrial applicability and commercial utility of the present invention will be extensive and long lasting.

What is claimed is:

1. A puncture resistant tire assembly for a load-carrying pneumatic tire having an interior surface, comprising:

an inflatable inner tube having an inner tube body, the inner tube body having a plurality of substantially radially outwardly extending deflectable structures thereon, the deflectable structures being integrally continuous with the inner tube body and pressurizable therewith, each deflectable structure further having a characteristic shape which includes a tapered tip to present a deflectable structure surface that is inclined and a load-bearing surface of minimal size; and a tire liner disposed between said inner tube and the interior surface of said tire, said tire liner having a plurality of separator structures thereon, the separator structures shaped for substantially mateable reception of the deflectable structures, the separator structures assisting the deflectable structures in the approximate maintenance of the characteristic shape when said tire is under load and cooperating with the deflectable structures for deflection of the same upon puncture of said tire liner by a sharp object.

2. The tire assembly of claim 1 further including fiction reducing means for allowing the deflectable structures to move with reduced friction as relative to one another and as relative to the separator structures.

3. The tire assembly of claim 1 wherein the deflectable structures have a shape that is finger-like in appearance.

4. The tire assembly of claim 1 wherein the deflectable structures are circumferentially continuous about the inner tube body.

5. The tire assembly of claim 1 further including folds located between the deflectable structures, the folds of a length to accommodate reception of sharp objects as commonly encountered on a vehicular travel path.

6. The tire assembly of claim 1 wherein the separator structures have the appearance of substantially parallel ridges.

7. The tire assembly of claim 6 wherein the separator structures run in continuous circumferential fashion along the liner.

8. The tire assembly of claim 1 wherein said inner tube is made of an elastomeric material.

9. A tire assembly for preventing depressurization of a pneumatic tire pierced by a sharp object, comprising:

an inner tube having an outer periphery with protruding pressurizable structures integrally fashioned thereon, the pressurizable structures of a cross-sectional shape which includes a tapered tip to present a surface which minimizes exposure of the pressurizable structures to a substantially vertically piercing of said tire by such sharp object; and shape-maintaining means for maintaining the approximate shape of the pressurizable structures when said tire is under load while allowing for substantially lateral deflectability of the pressurizable structures upon contact of the same with said sharp object.

10. The tire assembly of claim 9 wherein said shape-maintaining means includes a tire liner disposed about the outer periphery of said inner tube, the tire liner having cradling structures located thereon for supportably engaging the pressurizable structures.

11. The tire assembly of claim 10 wherein the cradling structures have the appearance of substantially parallel ridges.

12. The tire assembly of claim 11 wherein the cradling structures run in continuous circumferential fashion along the liner.

13. The tire assembly of claim 9 further including friction reducing means for allowing the pressurizable structures to move with reduced friction as relative to one another and as relative to the shape-maintaining means.

14. The tire assembly of claim 9 wherein the pressurizable structures are circumferentially continuous about the outer periphery of the inner tube.

15. The tire assembly of claim 9 wherein said inner tube and the pressurizable structures are made of an elastomeric material.

16. A puncture resistant tire assembly for a tire having an interior surface, comprising:

a first tire liner having a plurality of radially inwardly projecting separator structures thereon, said first tire liner being substantially circumferentially continuous within the tire interior surface; and a second tire liner having a plurality of hollow radially outwardly projecting deflectable structures having a tapered tip to provide a deflectable structure surface that is inclined and to present load bearing surface of minimal size, the deflectable structures being mateably received by the separator structures and shapely supported thereby, the separator structures cooperating with the deflectable structures for deflection of the same upon puncture of said first tire liner by a sharp object.

17. The tire assembly of claim 16 wherein said second tire liner is in the form of an inner tube.

18. The tire assembly of claim 16 further including friction reducing means for allowing the deflectable structures to move with reduced friction as relative to one another and as relative to the separator structures.

19. The tire assembly of claim 16 wherein the deflectable structures have a shape that is finger-like in appearance.

\* \* \* \* \*